United States Patent
Huang et al.

(10) Patent No.: US 11,215,160 B2
(45) Date of Patent: Jan. 4, 2022

(54) HORIZONTAL-AXIS OCEAN CURRENT POWER GENERATION DEVICE FOR UNDERWATER VEHICLE

(71) Applicants: ZHEJIANG UNIVERSITY, Hangzhou (CN); FUJIAN FUQING NUCLEAR POWER CO., LTD., Fuqing (CN)

(72) Inventors: Bin Huang, Hangzhou (CN); Pengzhong Wang, Hangzhou (CN); Pengcheng Du, Fuqing (CN); Dazhuan Wu, Hangzhou (CN); Peng Wu, Hangzhou (CN); Shuai Yang, Hangzhou (CN); Kexin Pu, Hangzhou (CN); Lu Wang, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 0 days.

(21) Appl. No.: 17/222,973

(22) Filed: Apr. 5, 2021

(65) Prior Publication Data
US 2021/0239086 A1    Aug. 5, 2021

Related U.S. Application Data

(63) Continuation of application No. PCT/CN2020/102015, filed on Jul. 15, 2020.

(51) Int. Cl.
*F03B 13/10* (2006.01)
*B63G 8/00* (2006.01)
(Continued)

(52) U.S. Cl.
CPC ............ *F03B 13/10* (2013.01); *B63G 8/001* (2013.01); *F03B 3/126* (2013.01); *H02K 7/1823* (2013.01)

(58) Field of Classification Search
CPC .......... F03B 13/10; F03B 3/126; B63G 8/001; H02K 7/1823
(Continued)

(56) References Cited

U.S. PATENT DOCUMENTS

2011/0283931 A1    11/2011    Moldovanu et al.

FOREIGN PATENT DOCUMENTS

| CN | 2674138 Y | 1/2005 |
|---|---|---|
| CN | 104454300 A | 3/2015 |

(Continued)

OTHER PUBLICATIONS

International Search Report (PCT/CN2020/102015); dated Jul. 15, 2020.

*Primary Examiner* — Charles Reid, Jr.
(74) *Attorney, Agent, or Firm* — W&G Law Group

(57) ABSTRACT

The present disclosure discloses a horizontal-axis ocean current power generation device for an underwater vehicle. The power generation device is disposed in a groove of a rotary body of the underwater vehicle, and includes an undercarriage unit, a yawing unit, and a power generation unit. The undercarriage unit can realize elevation and descent of the entire power generation device, and the power generation unit is capable of realizing arbitrary rotation within 360° in a horizontal plane through the yawing unit. The power generation device can actively yaw based on change of an ocean current direction to perform an incident flowing function. The power generation unit respectively drives an outer shaft and an inner shaft to rotate through a front blade and a rear blade that rotate in opposite directions, so as to drive inner and outer rotors of a motor, thereby cutting magnetic induction to generate electric power.

4 Claims, 3 Drawing Sheets

(51) Int. Cl.
*F03B 3/12* (2006.01)
*H02K 7/18* (2006.01)

(58) Field of Classification Search
USPC ..................................................... 290/42, 53
See application file for complete search history.

(56) References Cited

FOREIGN PATENT DOCUMENTS

| | | | |
|---|---|---|---|
| CN | 104481781 A | 4/2015 |
| CN | 104500313 A | 4/2015 |
| CN | 105179154 A | 12/2015 |
| CN | 109736997 A | 5/2019 |
| CN | 208918742 U | 5/2019 |
| CN | 110985268 A | 4/2020 |
| RU | 2364747 C1 | 8/2009 |

HORIZONTAL-AXIS OCEAN CURRENT POWER GENERATION DEVICE FOR UNDERWATER VEHICLE

TECHNICAL FIELD

The present disclosure relates to the field of power generation of ocean current energy, and more particularly, to a horizontal-axis ocean current power generation device for an underwater vehicle.

BACKGROUND

Countries in the world have focused on the development of renewable energy to solve an increasingly severe energy shortage problem. In the field of renewable energy, ocean current energy has characteristics of regularity, high energy density, and low impact by stormy waves, and it thus has gradually become the government focus of countries China has abundant ocean current energy reserves, and their potential development and utilization are huge. If ocean current in an environment of the vehicle can be collected and converted into electrical energy, the problem of underwater energy supply of the underwater vehicle will be solved and its underwater working time will be improved.

A horizontal-axis ocean current energy generator with contra-rotating propellers is a device that converts ocean current energy into electrical energy and generates electric power by contra-rotating blades. Most of existing horizontal-axis ocean current generators adopt uniflow or multiple-flow power generation technology, which is suitable for offshore areas. However, ocean current situations in deep-sea areas are complicated, and it is required for circumferential power generation to accommodate complicated sea conditions. However, a control method for achieving circumferential power generation of the horizontal-axis ocean current generator is to use a yawing device to control 360° rotation of the generator by gear transmission.

SUMMARY

The present disclosure proposes a horizontal-axis ocean current power generation device for an underwater vehicle, in order to overcome deficiencies of inability to accommodate deep-sea environment, a low energy conversion efficiency, and strict limitation on a traveling track in the related art.

A horizontal-axis ocean current power generation device for an underwater vehicle is disposed in a groove of a rotary body of the underwater vehicle, wherein the device includes an undercarriage unit, a yawing unit, and a power generation unit;

the undercarriage unit includes a retractable tube that is rotatable and has a power source, a first connecting rod, a second connecting rod, and a support post, one end of the retractable tube and one end of the first connecting rod are both rotatably connected to a bottom of the groove of the rotary body of the underwater vehicle, one end of the second connecting rod is rotatably connected on the support post, the other ends of the retractable tube, the first connecting rod and the second connecting rod are rotatably connected together, and the support post has a bottom end rotatably connected to the bottom of the groove of the rotary body of the underwater vehicle and a top end connected to the yawing unit; and the first connecting rod is driven to rotate with stretching and retraction of the retractable tube that is rotatable and has the power source, thereby driving the second connecting rod and the support post to rotate, the yawing unit includes a yawing ring gear, a plurality of yawing pinions, yawing driving devices, and a yawing support plate, the plurality of yawing pinions meshes with the yawing ring gear, each of the plurality of yawing pinions is fixedly connected with one of the yawing driving devices, the yawing driving devices are fixed on the yawing support plate, the yawing ring gear is fixed on the support post, and the yawing support plate is rotatably sleeved on the support post and supported by the support post;

the power generation unit is fixed on the yawing support plate; and the plurality of yawing pinions rotates relative to the yawing ring gear under the drive of the yawing driving devices, to adjust the power generation unit to actively yaw so as to achieve an incident flow, such that the power generation unit generates electric power in an inflow direction.

Further, the power generation unit includes a set of contra-rotating blades, inner and outer sleeve shaft devices, and contra-rotating inner and outer rotor devices of a direct-drive motor. A front blade is fixedly connected to an inner shaft that is fixedly connected to an inner rotor of the motor, and the front blade drives the inner rotor of the motor to rotate through the inner shaft. A rear blade is fixedly connected to an outer shaft. The outer shaft and the outer rotor of the motor are connected into one piece. Rotation of the rear blade is transmitted to the outer rotor of the motor by the outer shaft, the front and rear blades rotate in opposite rotation directions to respectively drive the inner and outer rotors of the motor to rotate in opposite directions, to cut magnetic induction lines to generate electric power.

Further, each of the front blade and the rear blade is a two-blade structure, and installation directions of the front blade and the rear blade are opposite to each other in a direction of the incident flow.

Further, the first connecting rod, the second connecting rod, the retractable tube that is rotatable and has the power source, and the support post satisfy the following condition: when the support post rotates to an upright state, the first connecting rod and the second connecting rod are arranged in a straight line, that is, the undercarriage unit is in a dead center position.

The beneficial effects of the present disclosure are described as follows:

The horizontal-axis ocean current power generation device with contra-rotating propellers for the underwater vehicle of the present disclosure has strong controllability and high conversion efficiency. An entire shape of the power generation device is cylindrical, and the structure is thus compact and the power generation device can be directly loaded on the underwater vehicle as a separate module. In addition, the undercarriage unit is in the dead center position during power generation, and thus the structure is firm. The device converts ocean current energy into electric energy for the underwater vehicle to substantially solve the energy supply problem of the underwater vehicle.

Figure 1:
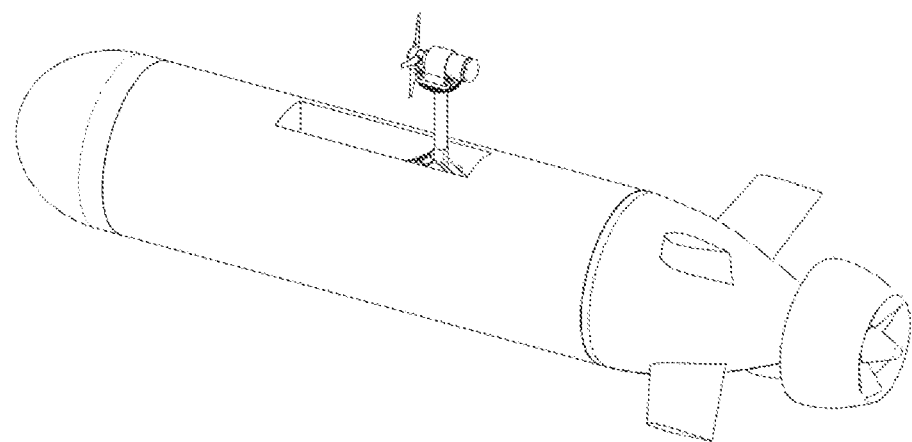
FIG. 1 is a schematic perspective view of an underwater vehicle having a horizontal-axis ocean current power generation device with contra-rotating propellers according to the present disclosure.

In the drawings, vehicle front section 1, vehicle middle section 2, vehicle rear section 3, horizontal-axis ocean current power generation device 4, fin rudder 5, pump injector 6, first connecting rod 401, retractable tube 402, second connecting rod 403, support bottom plate 404, support post 405, yawing ring gear 406, yawing pinion 407, yawing driving device 408, yawing support plate 409, front cover plate 410, front blade 411, rear blade 412, central shaft 413, front support hub 414, motor housing 415, middle hub 416, outer permanent magnet rotor 417, inner winding rotor 418, rear support hub 419, rear support cover 420, rear cover plate 421.

DESCRIPTION OF EMBODIMENTS

The present disclosure will be described in detail with reference to the drawings and preferable embodiments, and the purpose and effects of the present disclosure will become more apparent. It should be understood that specific embodiments described herein merely intend to explain the present disclosure, but not to limit the present disclosure thereto.

Figure 2:
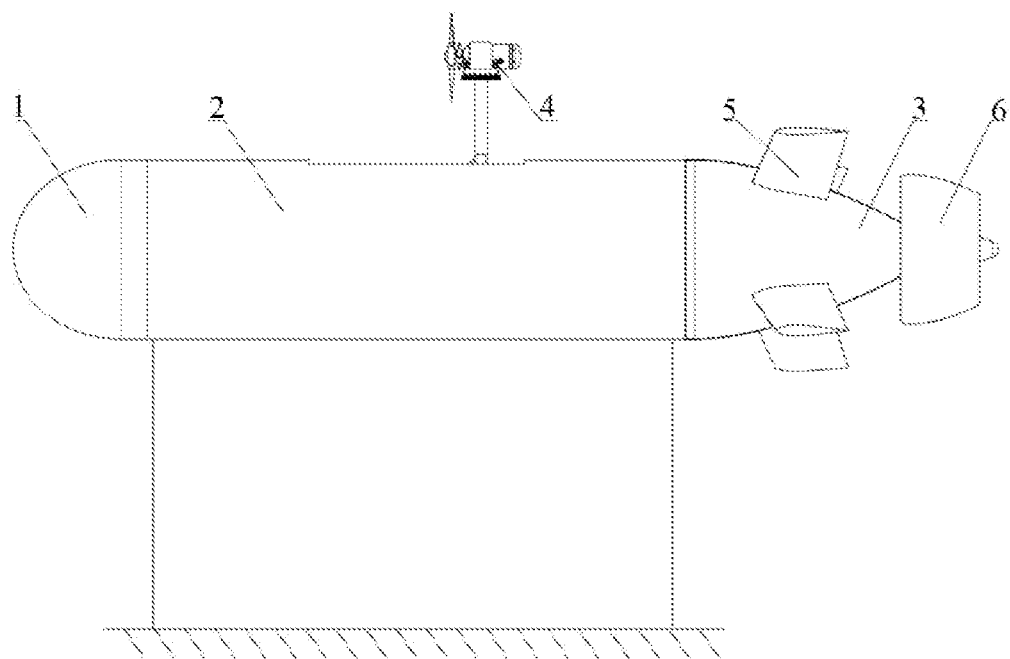
FIG. 2 is a front view of the underwater vehicle having the horizontal-axis ocean current power generation device with the contra-rotating propellers according to the present disclosure.

As shown in FIGS. 1-2, a horizontal-axis ocean current power generation device according to the present disclosure is installed on an underwater vehicle, and the underwater vehicle is one of various existing underwater vehicles. In an embodiment, the vehicle includes a vehicle front section 1, a vehicle middle section 2, a vehicle rear section 3, fin rudders 5, and a pump injector 6. The vehicle front section 1, the vehicle middle section 2 and the vehicle rear section 3 are all rotary bodies. A horizontal-axis ocean current power generation device 4 according to the present disclosure is installed in a groove of a rotary body of the vehicle middle section 2, in which the groove is in a rectangular shape and used to house the entire horizontal-axis ocean current power generation device 4. The length of the groove is slightly larger than the total length of the ocean current power generation device 4 and a support post 405, and the height of the groove is slightly smaller than the length of the ocean current power generation device. In this case, the entire ocean current power generation device is substantially fitted within an outer diameter range of a housing of the underwater vehicle, so as to reduce the resistance of the underwater vehicle during navigation.

Anchor chains are provided at the vehicle front section 1 and the vehicle rear section 3, so that the vehicle can be anchored horizontally and maintain stable. Accordingly, the underwater vehicle can meet a precondition that a turbine axis of the horizontal-axis ocean current power generation device 4 is maintained horizontally and the horizontal-axis ocean current power generation device is in a working condition.

The horizontal-axis ocean current power generation device of the present disclosure includes three parts, i.e. an undercarriage unit, a yawing unit, and a power generation unit.

Figure 4:
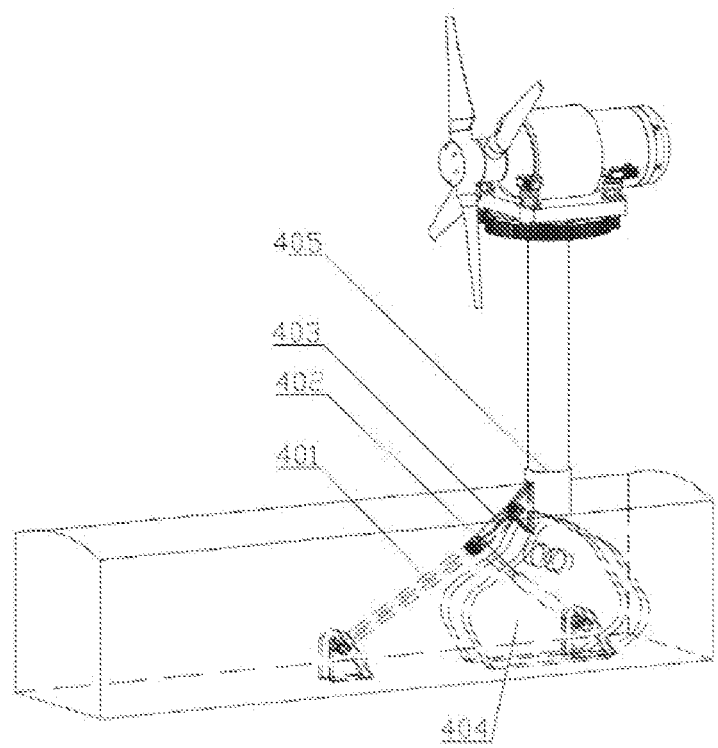
FIG. 4 is a schematic structural view of a yawing unit.

As shown in FIG. 4, the undercarriage unit includes a retractable tube 402 that is rotatable and has a power source, a first connecting rod 401, a second connecting rod 403, and the support post 405. A plurality of hinged mounts are disposed in the groove of the rotating body of the vehicle middle section 2, and one end of the first connecting rod 401 and one end of the retractable tube 402 are rotatably connected to a bottom of the groove by the hinged mounts, respectively. Two support bottom plates 404 are disposed on outer sides of the hinged mount of the retractable tube 402, and the retractable tube is rotatably connected to two support bottom plates 404 by rotary shafts. A bottom end of the support post 405 is in a cylindrical shape, and a top-end thereof is connected to the yawing unit. One end of the second connecting rod 403 is hinged to the support post 405, and the other ends of the retractable tube 402, the first connecting rod 401 and the second connecting rod 403 are hinged together. The retractable tube 402 with the power source is rotatable and retractable to drive the first connecting rod 401 to rotate, thereby driving the second connecting rod 403 and the support post 405 to rotate.

In order to form a triangular fixed manner to keep a horizontal axis of the ocean current power generation device parallel to a central axis of the vehicle, the first connecting rod 401, the second connecting rod 403, the retractable tube 402 that is rotatable and has the power source, and the support post 405 satisfy the following condition when the support post 405 rotates to be in an upright state, the first connecting rod 401 and the second connecting rod 403 are arranged in a straight line, that is, the undercarriage unit is in a dead center position.

Figure 3:
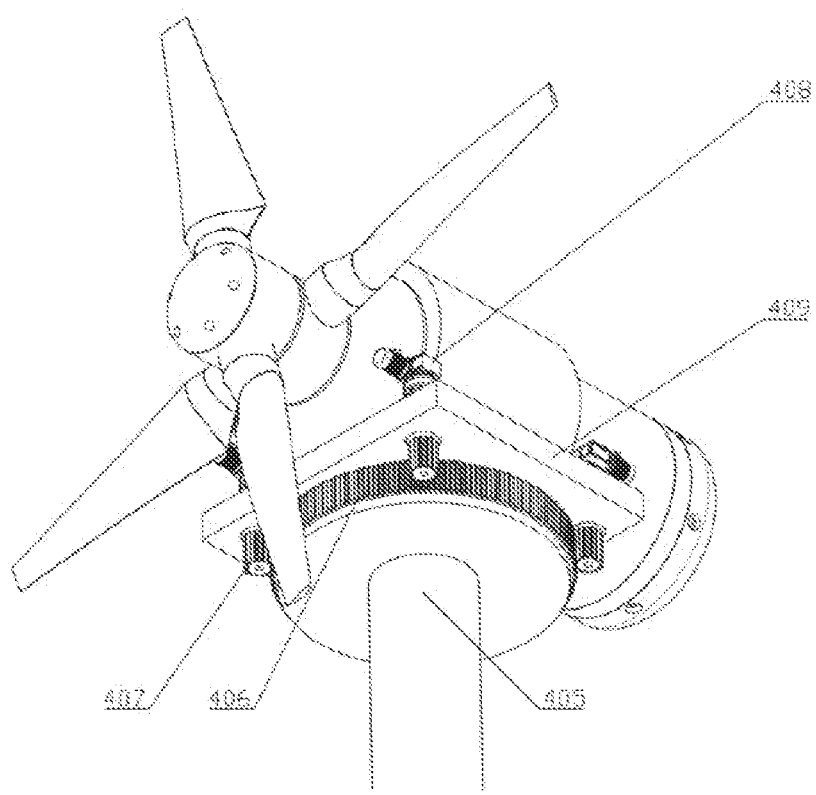
FIG. 3 is a schematic view of an overall structure of a horizontal-axis ocean current power generation device with contra-rotating propellers according to the present disclosure.

As shown in FIG. 3, the yawing unit includes a yawing ring gear 406, a plurality of yawing pinions 407, yawing driving devices 408 and a yawing support plate 409. The yawing ring gear 406 is fixed on the support post 405, and the yawing support plate 409 is sleeved on the top end of the support post 405 through a bearing and can rotate relative to the support post 405. The yawing driving devices 408 are fixed on the yawing support plate 409 and connected with the yawing pinion 407, and the yawing pinions 407 mesh with the yawing ring gear 406, thereby driving the power generation unit on the yawing support plate 409 to move.

Figure 5:
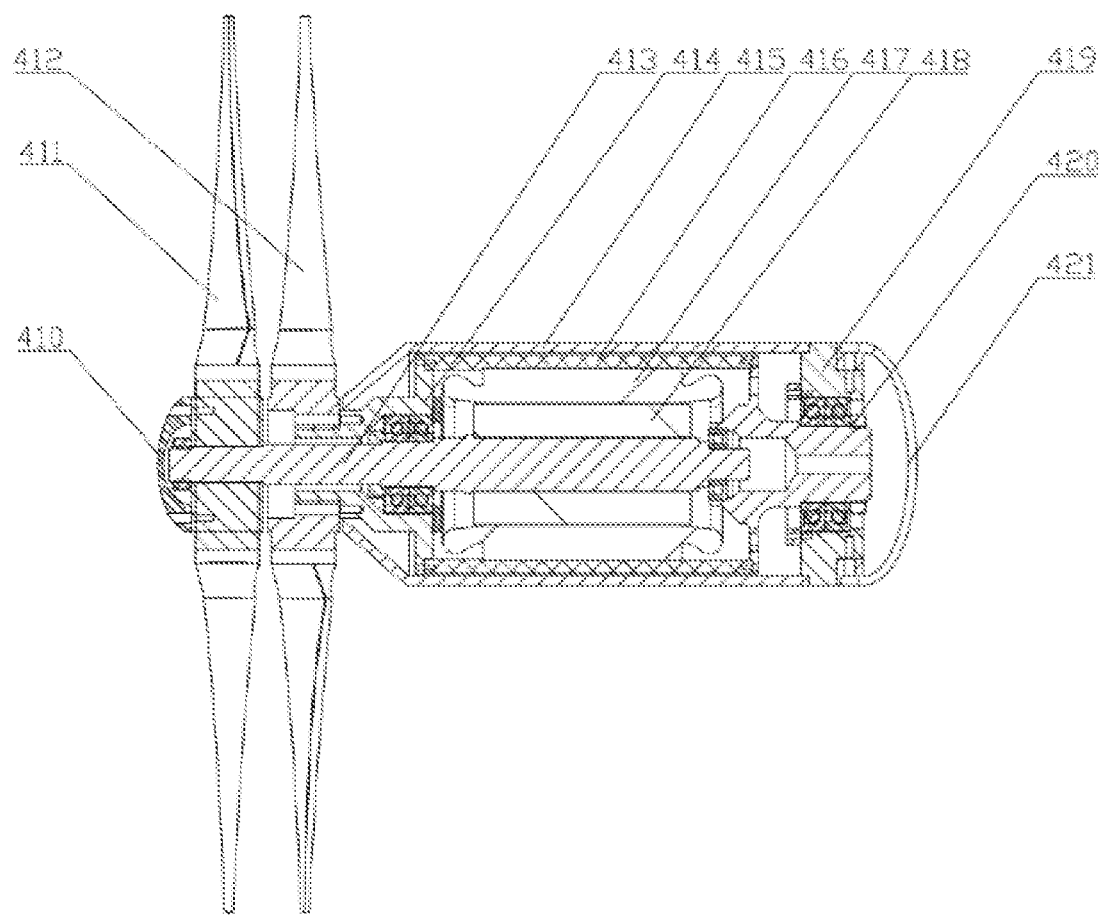
FIG. 5 is a sectional view of a power generation unit.

As shown in FIG. 5, the power generation unit includes a front cover plate 410, a front blade 411, a rear blade 412, a central shaft 413, a front support hub 414, a motor housing 415, a middle hub 416, an outer permanent magnet rotor 417, an inner winding rotor 418, a rear support hub 419, a rear support cover 420, and a rear cover plate 421.

Each of the front blade and the rear blade is a two-blade structure, and installation directions of them in an incident flow direction are opposite to each other.

An outer side of the front cover plate 410 is a circular arc surface and an inner side thereof is a toroidal surface, and the front cover plate is fixed at a front end of the central shaft 413. An outer side of the rear cover plate 421 is a circular arc surface and an inner side thereof is a toroidal surface, and the rear cover plate is fixed on the rear support cover 420, thereby forming sealed environment inside the motor. Both of the front blade 411 and the rear blade 412 adopt NACA airfoil. The front blade 411 is fixed at one end of the central shaft 413 by keys, the rear blade 412 is fixed on the from support hub 414, the front support hub 414 is fixedly connected to the middle hub 416, and the middle hub 416 is fixedly connected to the rear support hub 419, thereby assembling an outer shaft for rotation of the rear blade 412. The other end of the central shaft 413 is supported in the motor housing 415 by the rear support hub 419.

A power generation part of the power generation unit is an embedded permanent magnet generator, and includes the outer permanent magnet rotor 417 and the inner winding rotor 418. The inner winding rotor 418 is fixedly connected to the central shaft 413 by a key and the outer permanent magnet rotor 417 is fixedly connected to the middle hub 416, such that the outer permanent magnet rotor 417 of the permanent magnet generator can rotate along with the rotation of the rear blade 412.

The outer shaft composed of the front support hub 414, the middle hub 416 and the rear support hub 419, and the central shaft 413 are supported by a bearing, such that the inner and outer shafts do not interfere with each other to accommodate clockwise and counterclockwise rotation of the inner and outer shafts.

The front and rear blades respectively drive the inner and outer rotors of the permanent magnet motor to rotate in opposite directions, such that the outer permanent magnet rotor and the inner winding rotor of the generator both rotate about a longitudinal axis of the underwater vehicle. In this way, the outer permanent magnet rotor of the generator rotates relative to the inner winding rotor to cut magnetic induction lines and thus generate an induced electromotive force, thereby converting kinetic energy of an ocean current into mechanical energy and then converting the mechanical energy into electrical energy.

When the underwater vehicle is in an anchored condition during operation, the underwater vehicle drops the anchor chains to keep the vehicle horizontal and stable, and the undercarriage unit raises the ocean current power generation device until it maintains the turbine axis of the ocean current power generation device horizontal. In this case, the support post 405 is also in the upright state, and the two connecting rods are arranged in a straight line and the mechanism is in the dead center position. The undercarriage cannot rotate reversely although the support post 405 is subjected to a large force. In this case, the yawing unit starts to search for a direction of ocean current, and the yawing driving devices 408 adjust the blades of the ocean current power generation device to face towards an inflow direction, such that the power generation device on the support post 405 can be rotated arbitrarily within 360° in the horizontal plane through the yawing device. Hence, the power generation device can actively yaw based on change of the direction of ocean current to perform an incident flowing function, such that the horizontal-axis ocean current power generation device is in the working condition. The front blade 411 and the rear blade 412 are subjected to an ocean current torque, and the front blade 411 drives the central shaft 413 and the inner winding rotor 418 of the generator to rotate together about the longitudinal axis of the underwater vehicle. The rear blade 412 drives the outer shaft and the outer permanent magnet rotor 417 of the generator to rotate together about the longitudinal axis of the underwater vehicle. Therefore, the inner and outer rotors move relative to each other to cut the magnetic induction lines and thus generate the induced electromotive force, thereby converting remaining kinetic energy into mechanical energy and then converting the mechanical energy into electrical energy for the underwater vehicle.

Those skilled in the art can understand that the above description merely involve preferable embodiments of the present disclosure and are not intended to limit the present disclosure thereto. Although the present disclosure has been described in detail with reference to the foregoing embodiments, those skilled in the art can still modify the technical solutions described in the various embodiments or equivalently replace a pan of the technical features. All modifications and equivalent replacements made within the spirit and principle of the present disclosure shall be included in the scope of the present disclosure.

What is claimed is:

1. A horizontal-axis ocean current power generation device for an underwater vehicle, the power generation device being disposed in a groove of a rotary body of the underwater vehicle, wherein the horizontal-axis ocean current power generation device comprises an undercarriage unit, a yawing unit, and a power generation unit;

wherein the undercarriage unit comprises a retractable tube that is rotatable and has a power source, a first connecting rod, a second connecting rod, and a support post, one end of the retractable tube and one end of the first connecting rod are both rotatably connected to a bottom of the groove of the rotary body of the underwater vehicle, one end of the second connecting rod is rotatably connected to the support post, the other ends of the retractable tube, the first connecting rod and the second connecting rod are rotatably connected together, and the support post has a bottom end rotatably connected to the bottom of the groove of the rotary body of the underwater vehicle and a top end connected to the yawing unit; and the first connecting rod is driven to rotate with stretching and retraction of the retractable tube that is rotatable and has the power source, thereby driving the second connecting rod and the support post to rotate;

wherein the yawing unit comprises a yawing ring gear, a plurality of yawing pinions, yawing driving devices, and a yawing support plate, the plurality of yawing pinions meshes with the yawing ring gear, each of the plurality of yawing pinions is fixedly connected with one of the yawing driving devices, the yawing driving devices are fixed on the yawing support plate, the yawing ring gear is fixed on the support post, and the yawing support plate is rotatably sleeved on the support post and supported by the support post;

wherein the power generation unit is fixed on the yawing support plate; and wherein the plurality of yawing pinions rotate relative to the yawing ring gear under the drive of the yawing driving devices, to adjust the power generation unit to actively yaw so as to achieve an incident flow, such that the power generation unit generates electric power in an inflow direction.

2. The horizontal-axis ocean current power generation device for an underwater vehicle according to claim 1, wherein the power generation unit comprises a set of contra-rotating blades, inner and outer sleeve shaft devices, and contra-rotating inner and outer rotor devices of a direct-drive motor, a front blade is fixedly connected to an inner shaft, the inner shaft is fixedly connected to an inner rotor of the motor, the front blade drives the inner rotor of the motor to rotate through the inner shaft, a rear blade is fixedly connected to an outer shaft, the outer shaft and an outer rotor of the motor are connected into one piece, rotation of the rear blade is transmitted to the outer rotor of the motor by the outer shaft, the front blade and the rear blade rotate in opposite rotation directions to respectively drive the inner rotor and the outer rotor of the motor to rotate in opposite directions, to cut magnetic induction lines to generate electric power.

3. The horizontal-axis ocean current power generation device for an underwater vehicle according to claim 2, wherein each of the front blade and the rear blade is a two-blade structure, and installation directions of the front blade and the rear blade are opposite to each other in a direction of the incident flow.

4. The horizontal-axis ocean current power generation device for an underwater vehicle according to claim 1, wherein the first connecting rod, the second connecting rod, the retractable tube that is rotatable and has the power source, and the support post satisfy a following condition:

when the support post rotates to an upright state, the first connecting rod and the second connecting rod are arranged in a straight line, that is, the undercarriage unit is in a dead center position.

\* \* \* \* \*

UNITED STATES PATENT AND TRADEMARK OFFICE
CERTIFICATE OF CORRECTION

PATENT NO. : 11,215,160 B2  
APPLICATION NO. : 17/222973  
DATED : January 4, 2022  
INVENTOR(S) : Bin Huang et al.

Page 1 of 1

It is certified that error appears in the above-identified patent and that said Letters Patent is hereby corrected as shown below:

On the Title Page

Items (71) and (73) Please remove Fujian Fuqing Nuclear Power Co., Ltd. as an applicant and as an assignee and maintain Zhejiang University as the only applicant and the only assignee.

Signed and Sealed this  
First Day of February, 2022

Drew Hirshfeld  
*Performing the Functions and Duties of the*  
*Under Secretary of Commerce for Intellectual Property and*  
*Director of the United States Patent and Trademark Office*

UNITED STATES PATENT AND TRADEMARK OFFICE
CERTIFICATE OF CORRECTION

| | | |
|---|---|---|
| PATENT NO. | : 11,215,160 B2 | Page 1 of 1 |
| APPLICATION NO. | : 17/222973 | |
| DATED | : January 4, 2022 | |
| INVENTOR(S) | : Bin Huang et al. | |

It is certified that error appears in the above-identified patent and that said Letters Patent is hereby corrected as shown below:

This certificates supersedes the Certificate of Correction issued on February 1, 2022. The certificate which issued February 1, 2022, is vacated because the certificate issued without proper approval of Petition 1.182 and 3.81 for the requested correction to items (71) and (73) of U.S. Patent No. 11,215,160 B2. The Certificate of Correction which issued on February 1, 2022 was published in error and should not have been for this patent.

Signed and Sealed this
Twenty-sixth Day of April, 2022

Katherine Kelly Vidal
*Director of the United States Patent and Trademark Office*

UNITED STATES PATENT AND TRADEMARK OFFICE
CERTIFICATE OF CORRECTION

| | | |
|---|---|---|
| PATENT NO. | : 11,215,160 B2 | |
| APPLICATION NO. | : 17/222973 | |
| DATED | : January 4, 2022 | |
| INVENTOR(S) | : Bin Huang et al. | |

It is certified that error appears in the above-identified patent and that said Letters Patent is hereby corrected as shown below:

On the Title Page

Item (71) Fujian Fuqing Nuclear Power Co., Ltd. is removed as an applicant.

Signed and Sealed this
Thirty-first Day of May, 2022

Katherine Kelly Vidal
*Director of the United States Patent and Trademark Office*

UNITED STATES PATENT AND TRADEMARK OFFICE
CERTIFICATE OF CORRECTION

| | | |
|---|---|---|
| PATENT NO. | : 11,215,160 B2 | Page 1 of 1 |
| APPLICATION NO. | : 17/222973 | |
| DATED | : January 4, 2022 | |
| INVENTOR(S) | : Bin Huang et al. | |

It is certified that error appears in the above-identified patent and that said Letters Patent is hereby corrected as shown below:

This certificate supersedes the Certificate of Correction issued on May 31, 2022. The certificate which issued May 31, 2022, is vacated because the certificate issued without proper approval of Petition 1.182 for requested correction to item (71) of U.S. Patent No. 11,215,160 B2. The Certificate of Correction which issued May 31, 2022 was published in error and should not have been for this patent.

Signed and Sealed this
Sixth Day of September, 2022

Katherine Kelly Vidal
*Director of the United States Patent and Trademark Office*